United States Patent
Sim

(10) Patent No.: US 8,295,889 B2
(45) Date of Patent: Oct. 23, 2012

(54) ASSEMBLY FOR A SOUND REPRODUCTION APPARATUS INCLUDED WITH A COMMUNICATIONS APPARATUS AND A METHOD OF USING THE ASSEMBLY

(75) Inventor: Wong Hoo Sim, Singapore (SG)

(73) Assignee: Creative Technology Ltd, Singapore (SG)

( * ) Notice: Subject to any disclaimer, the term of this patent is extended or adjusted under 35 U.S.C. 154(b) by 299 days.

(21) Appl. No.: 12/810,562

(22) PCT Filed: Nov. 12, 2008

(86) PCT No.: PCT/SG2008/000431
§ 371 (c)(1),
(2), (4) Date: Jun. 25, 2010

(87) PCT Pub. No.: WO2009/082357
PCT Pub. Date: Jul. 2, 2009

(65) Prior Publication Data
US 2010/0279743 A1   Nov. 4, 2010

(30) Foreign Application Priority Data
Dec. 26, 2007   (SG) ................ 200719007-7

(51) Int. Cl.
*H04M 1/00*   (2006.01)
(52) U.S. Cl. ........... 455/569.1; 455/90.3; 455/575.2; 381/370; 381/376
(58) Field of Classification Search ........... 455/550.1, 455/569.1, 575.1, 575.2, 575.6, 90.3; 381/367, 381/370, 374, 376
See application file for complete search history.

(56) References Cited

U.S. PATENT DOCUMENTS
2003/0224839 A1* 12/2003 Takahashi et al. ......... 455/575.2
2007/0121985 A1   5/2007 Park

FOREIGN PATENT DOCUMENTS
WO   WO0106739 A1   1/2001
WO   WO03031307 A1   4/2003

* cited by examiner

*Primary Examiner* — Edward Urban
*Assistant Examiner* — Golam Sorowar
(74) *Attorney, Agent, or Firm* — Creative Technology Ltd

(57) ABSTRACT

There is provided an assembly for a sound reproduction apparatus included with a communications apparatus. The assembly includes an ear bud earphone that anchors to an ear of a user; a cable of the ear bud earphone, a portion of the cable being attached to a reel axle onto which the cable is windable, the reel axle being connected to a revolution counter which tracks a number of revolutions of the reel axle in a first direction, the revolution counter being reset to zero when the cable is fully wound onto the reel axle; with a first end of the cable being functionally connected to the communications apparatus to enable sound signals to be reproduced in the ear bud earphone. The functional connection to the communications apparatus may be either via a solder joint or a detachable connector.

18 Claims, 3 Drawing Sheets

ASSEMBLY FOR A SOUND REPRODUCTION APPARATUS INCLUDED WITH A COMMUNICATIONS APPARATUS AND A METHOD OF USING THE ASSEMBLY

FIELD OF INVENTION

The present invention relates to an assembly for a sound reproduction apparatus, particularly a retractable ear bud ear phone which is included with a communications apparatus.

BACKGROUND

It is typical for mobile phones to be held close to a user's ear when making calls on the mobile phones. This follows the convention from the earliest telephone sets whereby a ear piece is usually placed close to a receiver's ear to ensure that the receiver is able to hear what the caller is saying. However, research has shown that mobile phones emit radiation. This radiation is sometimes a cause of discomfort for certain individuals who are susceptible to the effects of the radiation. The discomfort may include effects such as, for example, headaches, dizziness, an increase in temperature at a localized area close to the user's ear, and so forth.

It is also well known that holding and using mobile phones while driving is a dangerous practice which jeopardizes the safety of both the user and other road users. A wide variety of hands-free earpiece systems are currently available, but the systems which utilise cables usually have cable management issues, and the systems which utilise wireless solutions (predominantly Bluetooth) also have issues relating to radiation exposure.

In this regard, the existing solutions for hands-free earpiece systems are unable to adequately address problems experienced by users.

SUMMARY

In a first aspect, there is provided an assembly for a sound reproduction apparatus included with a communications apparatus. The assembly includes a ear bud earphone that anchors to a ear of a user when the earphone is inserted into a ear canal of the ear of the user; a cable of the ear bud earphone with a portion of the cable being attached to a reel axle onto which the cable is windable, and the reel axle being connected to a revolution counter which tracks a number of revolutions of the reel axle in a first direction.

The revolution counter may be reset to zero when the cable is fully wound onto the reel axle; with a first end of the cable being functionally connected to the communications apparatus to enable sound signals to be reproduced in the ear bud earphone. The functional connection to the communications apparatus may be either via a solder joint or a detachable connector. The first end of the cable may be substantially close to the portion of the cable attached to the reel axle. It is preferable that when the functional connection is via the detachable connector, the assembly is detachable from the communications apparatus. The assembly may be a part of a pouch for the communications apparatus, with the assembly being correspondingly detachable and de-coupled from the communications apparatus when the communications apparatus is removed from the pouch.

It is advantageous that the revolution counter activates both a control to receive an incoming call to the communications apparatus, and a microphone on the communications apparatus when the revolution counter counts a pre-determined number of revolutions of the reel axle rotating in the first direction. The assembly may further include an implement for either radiation absorption or radiation suppression to minimize exposure of radiation emitted by the communications apparatus to the user. The microphone enables speech to be input to the communications apparatus by the user.

The reel axle may be biased to wind the cable onto the reel axle in opposition to a continual force either pulling the cable or pulling the assembly, and locking the reel axle in a fixed position of rotation when the continual force is removed. Preferably, the reel axle winds the cable onto the reel axle when a force either pulling the cable or pulling the assembly is applied and removed in a jerking action. Alternatively, the reel axle winds the cable onto the reel axle when the user manually unlocks the reel axle from the fixed position of rotation by allowing a biasing force to act on the reel axle. The reel axle may be biased using a mechanical spring. The reel axle may be motorized, and winding the cable is enabled by operating a motor coupled to the reel axle.

Preferably, the cable is fully wound when the reel axle rotates an identical number of revolutions as measured in the first direction by the revolution counter, but with the reel axle rotating in a direction opposite to the first direction.

It is advantageous that receiving the incoming call generates an audible feedback for the user to indicate that the incoming call is being answered. The audible feedback may be either generated digitally or the reel axle may include a mechanical clicker to generate a "click" sound once the reel axle is rotated a pre-determined number of revolutions in the first direction.

In a second aspect, there is provided a method of answering an incoming call using the aforementioned assembly. The method includes grasping the communications apparatus and locating the ear bud earphone into the user's ear canal by placing the communications apparatus close to the user's ear; pulling the communications apparatus away from the user's ear; and hearing an audible feedback to indicate that the incoming call is answered. Advantageously, only one hand is required to answer the incoming call on the communications apparatus.

It is preferable that the ear bud earphone is positioned for ease of insertion into the user's ear canal when the ear bud earphone is parked in the communications apparatus. A head of the ear bud earphone may protrude from a compartmentalized portion when parked in the communications apparatus, and the protrusion of the head may allow for ease of insertion into the user's ear canal. The audible feedback may be either generated digitally or the reel axle may include a mechanical clicker to generate a "click" sound once the reel axle is rotated a pre-determined number of revolutions in the first direction.

DESCRIPTION OF DRAWINGS

In order that the present invention may be fully understood and readily put into practical effect, there shall now be described by way of non-limitative example only preferred embodiments of the present invention, the description being with reference to the accompanying illustrative drawings.

DESCRIPTION OF PREFERRED EMBODIMENTS

Figure 1:
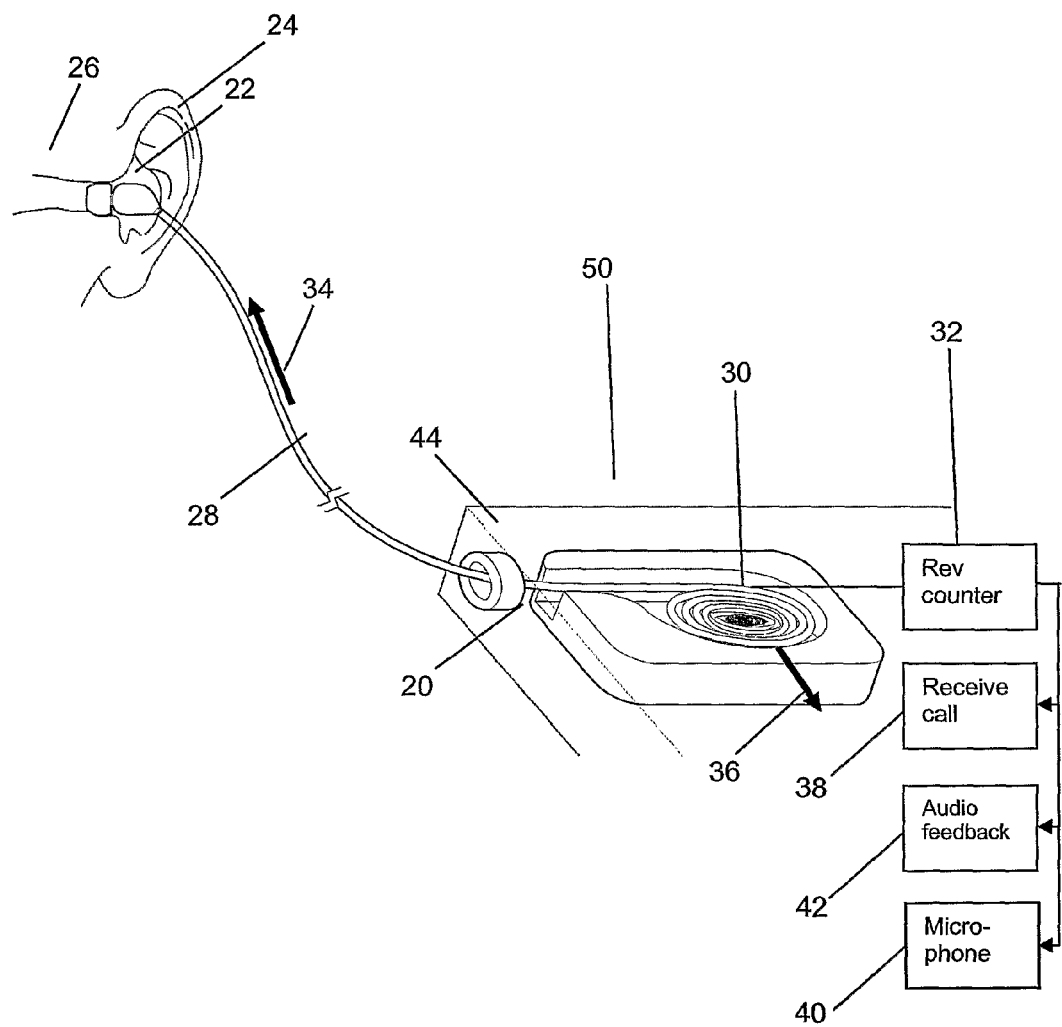
FIG. 1 shows components of the assembly of the present invention with some parts in a partial cut-away view.

Referring to FIG. 1, there is provided an assembly 20 for a sound reproduction apparatus included with a communications apparatus 50. The assembly 20 should be unobtrusive such that inclusion with the communications apparatus 50 would not lead to a substantial increase in a thickness of the communications apparatus 50. The assembly 20 includes a ear bud earphone 22 that anchors to a ear 24 of a user when the earphone 22 is inserted into a ear canal 26 of the ear 24 of the user. The earphone 22 is primarily for the user to listen to speech of an incoming caller to the communications apparatus 50. The earphone 22 may also be used to listen to audio output from the communications apparatus 50 should the user desire that functionality.

The assembly 20 also includes a cable 28 of the ear bud earphone 22. A portion of the cable 28 may be attached to a reel axle 30 onto which the cable 28 is windable. The reel axle 30 may be biased using a mechanical spring. The reel axle 30 is biased to wind the cable 28 onto the reel axle 30 in opposition to a continual force either pulling the cable 28 (34) or pulling the assembly 20 (36), and locking the reel axle 30 in a fixed position of rotation when the continual force 34/36 is removed. The continual force from pulling the cable 28 (34) may be applied when the ear bud earphone 22 is pulled away from the assembly 20. Similarly, the continual force from pulling the assembly 20 (36) may be applied when the assembly 20 is pulled after the ear bud earphone 22 is located within the ear canal 26 of the user.

The reel axle 30 may wind the cable 28 onto the reel axle 30 when a force either pulling the cable 28 or pulling the assembly 20 is applied and removed in a jerking action. Alternatively, the reel axle 30 may wind the cable 28 onto the reel axle 30 when the user manually unlocks the reel axle 30 from the fixed position of rotation by allowing a biasing force to act on the reel axle 30. The manual unlocking of the reel axle 30 may be performed by activating a control on the reel axle 30, such as, for example, a button.

In an alternative embodiment, the reel axle 30 may be motorized for winding the cable 28. The winding of the cable 28 may be enabled by operating a motor coupled to (powering) the reel axle 30.

The reel axle 30 may be connected to a revolution counter 32 which tracks a number of revolutions of the reel axle 30 in a first direction. The revolution counter 32 is reset to zero when the cable 28 is fully wound onto the reel axle 30. It should be noted that the cable 28 is fully wound when the reel axle 30 rotates an identical number of revolutions as measured in the first direction by the revolution counter, but with the reel axle 30 rotating in a direction opposite to the first direction. For example, if the first direction of revolution is in a clock-wise direction, the direction opposite to the first direction is in an anti clock-wise direction.

A first end of the cable 28 (typically an end of the cable 28 without the ear bud earphone 22), substantially close to the portion of the cable 28 attached to the reel axle 30 may be functionally connected to the communications apparatus 50 to enable sound signals from the communications apparatus 50 to be reproduced in the ear bud earphone 22. The functional connection to the communications apparatus 50 may be either via a solder joint or a detachable connector. When the functional connection is via the detachable connector, the assembly 20 may be detachable from the communications apparatus 50.

The assembly 20 may be detachable with or without dismantling the communications apparatus 50, and this is dependent on whether the assembly 20 was designed to be an add-on accessory to the communications apparatus 50. If the assembly 20 was designed as an add-on accessory, dismantling the communications apparatus 50 to detach the assembly 20 would likely be unnecessary. An example of the add-on accessory for assembly 20 may be in a form of being part of a pouch for the communications apparatus 50. The pouch may be made from a material such as, for example, leather, silicone, fabric, and so forth. The pouch may be able to protect the communications apparatus 50 from scratches and impacts. The pouch may also be usable as a stand for the communications apparatus 50 in a manner similar to a leather case for the Zen media player by Creative Technology Ltd. In this regard, removal of the communications apparatus 50 from the pouch would also de-couple the assembly 20 from the communications apparatus 50.

In a preferred embodiment, the revolution counter 32 may activate both a control 38 to receive an incoming call to the communications apparatus 50, and a microphone 40 on the communications apparatus 50 once the revolution counter 32 counts a pre-determined number of revolutions of the reel axle 30 rotating in the first direction. The microphone 40 may enable speech to be input to the communications apparatus 50 by the user during a video conference session, a telephone conversation, or a voice recording. When the user is receiving the incoming call, an audible feedback for the user may be generated to indicate that the incoming call is being answered. The audible feedback may be generated digitally 42 or the reel axle 30 may include a mechanical clicker to generate a "click" sound once the reel axle 30 is rotated the pre-determined number of revolutions in the first direction. The cable 28 may be further extended after the audible feedback is generated.

Finally, the assembly 20 may further include an implement for either radiation absorption or radiation suppression to minimize exposure of radiation emitted by the communications apparatus 50 to the user. A ferrite core 44 to minimize exposure of radiation emitted by the communications apparatus 50 to the user is shown in FIG. 1. The ferrite core 44 may absorb RF radiation emitted by the communications apparatus 50. While the ferrite core 44 in FIG. 1 is shown in a cylindrical form, it should be noted that the implement need not be in a cylindrical form and may be in the form of a shield of a useful shape. The implement may be located at a source of the radiation and need not be visible to the user of the communications apparatus 50 as shown in FIG. 1.

Figure 2:
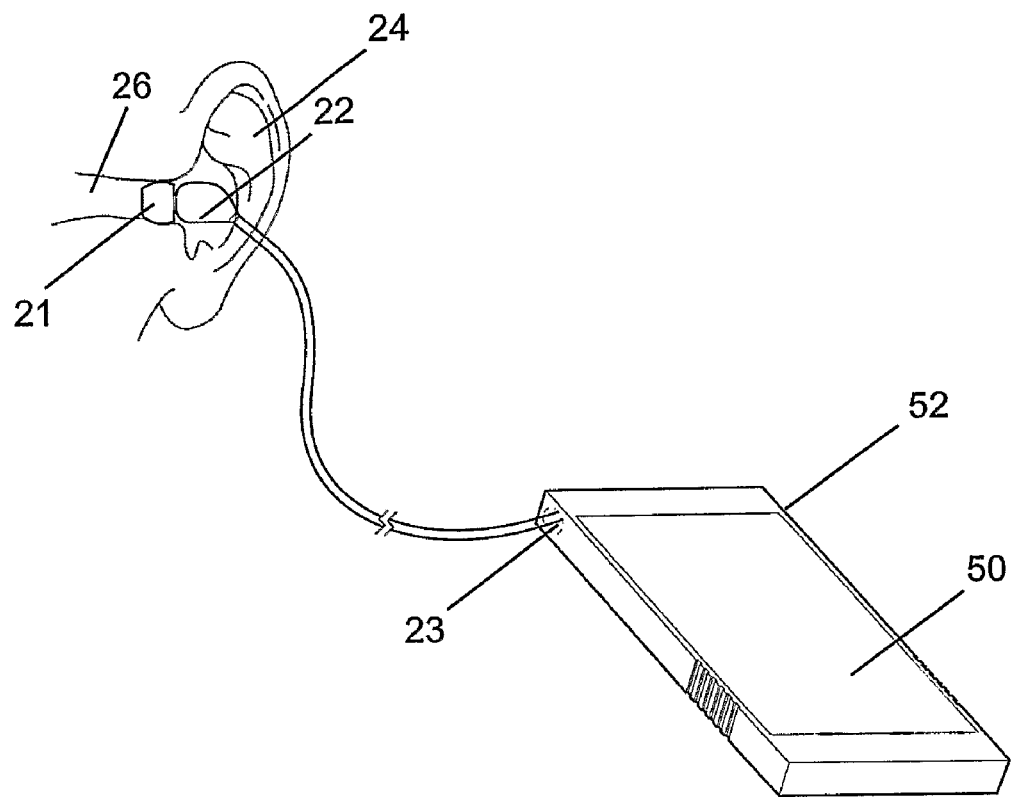
FIG. 2 shows a perspective view of the assembly when used in a communications apparatus.
Figure 3:
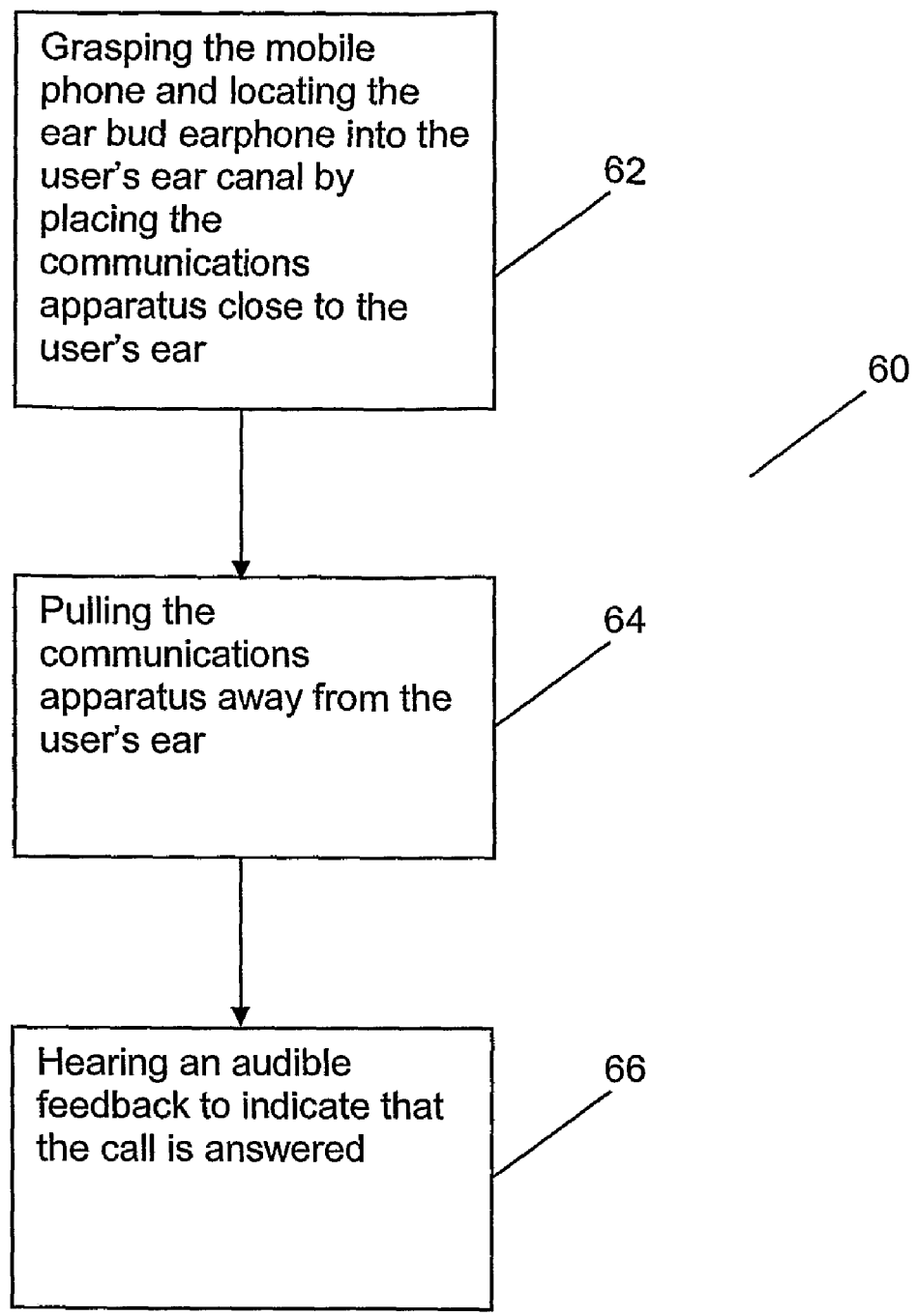
FIG. 3 shows a process flow chart of the method of the present invention.

Referring to FIG. 2, there is shown a communications apparatus 50 used with the assembly 20 as described earlier. The assembly 20 is shown to be concealed within a case 52 of the communications apparatus 50. The ear bud earphone 22 is compartmentalized 23 within the case 52 of the communications apparatus 50 before it is located within the ear canal 26 of the ear 24 of the user.

In a second aspect, there is provided a method 60 of answering an incoming call using the assembly 20 when incorporated within a communications apparatus 50. The method 60 includes grasping the communications apparatus 50 and locating the ear bud earphone 22 into the user's ear canal 26 by placing the communications apparatus 50 close to the user's ear 24 (62). This may be possible if the ear bud earphone 22 is positioned for ease of insertion into the user's ear canal when the ear bud earphone 22 is parked in the communications apparatus 50. For example, with reference to FIG. 2, a head 21 of the ear bud earphone 22 may protrude from the compartmentalized 23 portion of the case 52 when parked in the communications apparatus 50. The protrusion of the head 21 of the ear bud earphone 22 allows for ease of insertion into the user's ear canal 26.

Subsequently, the communications apparatus 50 may be pulled away from the user's ear 24 (64). The greater the distance of the communications apparatus 50 from the user's ear 24, the lesser an extent of radiation exposure by the user.

Finally, the user may hear an audible feedback to indicate that the incoming call is answered (66). The audible feedback may be generated digitally or the reel axle 30 may include a mechanical clicker to generate a "click" sound once the reel axle 30 is rotated the pre-determined number of revolutions in the first direction. The cable 28 may be further extended after the audible feedback is generated.

It is advantageous that only one hand is required to answer the incoming call on the communications apparatus 50. This aids in enhancing safety and convenience when using the communications apparatus 50 during driving.

Whilst there has been described in the foregoing description preferred embodiments of the present invention, it will be understood by those skilled in the technology concerned that many variations or modifications in details of design or construction may be made without departing from the present invention.

The invention claimed is:

1. An assembly for a sound reproduction apparatus included with a communications apparatus, the assembly including:
   an ear bud earphone that anchors to an ear of a user when the earphone is inserted into an ear canal of the ear of the user;
   a cable of the ear bud earphone, a portion of the cable being attached to a reel axle onto which the cable is windable, the reel axle being connected to a revolution counter which tracks a number of revolutions of the reel axle in a first direction, the revolution counter being reset to zero when the cable is fully wound onto the reel axle; and
   a first end of the cable being functionally connected to the communications apparatus to enable sound signals to be reproduced in the ear bud earphone;
   wherein the revolution counter activates both a control to receive an incoming call to the communications apparatus, and a microphone on the communications apparatus when the revolution counter counts a predetermined number of revolutions of the reel axle rotating in the first direction,
   wherein when receiving the incoming call to the communications apparatus, an audible feedback is generated for the user to indicate that the incoming call is being answered.

2. The assembly of claim 1, wherein the reel axle is biased to wind the cable onto the reel axle in opposition to a continual force either pulling the cable or pulling the assembly, and locking the reel axle in a fixed position of rotation when the continual force is removed.

3. The assembly of claim 2, wherein the reel axle winds the cable onto the reel axle when a force either pulling the cable or pulling the assembly is applied and removed in a jerking action.

4. The assembly of claim 2, wherein the reel axle winds the cable onto the reel axle when the user manually unlocks the reel axle from the fixed position of rotation by allowing a biasing force to act on the reel axle.

5. The assembly of claim 2, wherein the reel axle is biased using a mechanical spring.

6. The assembly of claim 1, wherein the reel axle is motorized, and winding the cable is enabled by operating a motor coupled to the reel axle.

7. The assembly of claim 1, wherein the cable is fully wound when the reel axle rotates an identical number of revolutions as measured in the first direction by the revolution counter, but With the reel axle rotating in a direction opposite to the first direction.

8. The assembly of claim 1, further including an implement for either radiation absorption or radiation suppression to minimize exposure of radiation emitted by the communications apparatus to the user.

9. The assembly of claim 1, wherein the audible feedback is either generated digitally or the reel axle may include a mechanical clicker to generate a "click" sound once the reel axle is rotated a pre-determined number of revolutions in the first direction.

10. The assembly of claim 1, wherein the microphone enables speech to be input to the communications apparatus by the user.

11. The assembly of claim 1, wherein the first end of the cable is substantially close to the portion of the cable attached to the reel axle, the first end of the cable being the end without the ear bud earphone.

12. The assembly of claim 1, wherein the functional connection to the communications apparatus may be either via a solder joint or a detachable connector.

13. The assembly of claim 12, wherein when the functional connection is via the detachable connector, the assembly is detachable from the communications apparatus.

14. The assembly of claim 13, wherein the assembly is a part of a pouch for the communications apparatus, the assembly being detachable and decoupled from the communications apparatus when the communications apparatus is removed from the pouch.

15. A method of answering an incoming call using the assembly of claim 1, the method including:
   grasping the communications apparatus and locating the ear bud earphone into the user's ear canal by placing the communications apparatus close to the user's ear;
   pulling the communications apparatus away from the user's ear; and
   hearing an audible feedback to indicate that the incoming call is answered,
   wherein only one hand is required to answer the incoming call on the communications apparatus.

16. The method of claim 15, wherein the ear bud earphone is positioned for ease of insertion into the user's ear canal when the ear bud earphone is parked in the communications apparatus.

17. The method of claim 16, wherein a head of the ear bud earphone protrudes from a compartmentalized portion when parked in the communications apparatus with the protrusion of the head allowing for ease of insertion into the user's ear canal.

18. The method of claim 15, wherein the audible feedback is either generated digitally or the reel axle may include a mechanical clicker to generate a "click" sound once the reel axle is rotated a pre-determined number of revolutions in the first direction.

* * * * *